United States Patent
Inoue

Patent Number: 5,343,413
Date of Patent: Aug. 30, 1994

[54] LEADING ONE ANTICIPATOR AND FLOATING POINT ADDITION/SUBTRACTION APPARATUS

[75] Inventor: Genichiro Inoue, Osaka, Japan

[73] Assignee: Matsushita Electric Industrial Co., Ltd., Osaka, Japan

[21] Appl. No.: 84,125

[22] Filed: Jul. 1, 1993

[30] Foreign Application Priority Data

Jul. 6, 1992 [JP] Japan .................. 4-178000

[51] Int. Cl.⁵ .............................................. G06F 7/00
[52] U.S. Cl. ................... 364/715.04; 364/748
[58] Field of Search ............ 364/715.10, 715.04, 364/748

[56] References Cited

U.S. PATENT DOCUMENTS 4,926,369  5/1990  Hokenek et al. .............. 364/748
5,187,678  2/1993  Hori ......................... 364/715.04
5,204,825  4/1993  Ng ........................... 364/715.04

Primary Examiner—Tan V. Mai
Attorney, Agent, or Firm—Willian, Brinks, Hofer, Gilson & Lione

[57] ABSTRACT

A bit-discard amount anticipator anticipates a bit-discard amount within a one-bit error. A borrow propagator propagates a borrow from a least significant bit side. A selector modifies an output of the bit-discard amount anticipator to an accurate bit shift amount required at a normalization and outputs it, using information of the borrow propagator. The bit shift amount for the normalization in case where a bit discard is caused at a mantissa subtraction of a floating point calculation is accurately obtained, thus reducing a process at the normalization.

5 Claims, 10 Drawing Sheets

LEADING ONE ANTICIPATOR AND FLOATING POINT ADDITION/SUBTRACTION APPARATUS

BACKGROUND OF THE INVENTION

This invention relates to an apparatus for executing an addition-normalization operation of a floating point calculation, and more particularly relates to a leading one anticipator for anticipating a bit-discard amount resulting from a floating point addition or subtraction and a floating point addition/subtraction apparatus using the leading one anticipator.

Floating point addition and subtraction may cause a case where a subtraction is performed with respect to mantissa values according to a combination of signs of two operands and a addition/subtraction processing. When an absolute value of a difference of exponents of the two operands is not exceeding 1 in the mantissa subtraction, there is a possibility of at least 2 bit-discards of the mantissa value caused. When at least 2 bit-discards is caused, it is necessary to calculate the bit-discard amount for normalizing a result of mantissa subtraction and to normalize the result of subtraction together with the bit-discard amount. However, the addition-normalization is time consuming when the bit-discard amount is calculated and normalized after the result of mantissa subtraction is outputted. It is known that the addition-normalization operation time is reduced by anticipating the bit-discard amount at the normalization prior to or in parallel with the mantissa subtraction by means besides an addition circuit.

As a first conventional example, U.S. Pat. No. 4,926,369 to Hokenek et al. discloses such an apparatus, which is explained below with reference to a drawing. FIG. 8 is a transition diagram showing an algorithm of the leading one anticipator in the first conventional example. The bit-discard amount is anticipated by detecting, from a most significant bit side, a combinational network which processes XOR (P, propagate), AND (G, generate), and NOR (Z, zero) state signals resulting from the comparison of the bits in corresponding bit positions of the two operands in 2's complement notation. First, the state of the most significant bit ($G_{MSB}$, $Z_{MSB}$, $P_{MSB}$) is determined. When the state is G or Z, a signal is produced indicating a shift amount, which amount is counted for each successive state signals detected, as long as the state remains true. When the state becomes false, production of the shift amount signals is halted and an adjustment signal is produced. The adjustment signal is based on a carry from a lower bit at the false bit position, and the state at the false bit position is used to determine whether the result of the addition is positive or negative.

When the state of the most significant bit is P (PMSB), halting of the shift amount signals becomes dependent upon the state of the state signal for the bit position following the false bit position. If the second state (Gj or Zj) at the false bit position is followed by a state signal of the third state (Z when P→G, or G when P→Z), then production of the shift amount signals is continued until the third state becomes false. Otherwise, the shift signals are halted at one bit position following the false bit position. In these cases the adjustment signals is based on the carry from a lower bit at the bit position at which the shift signals are halted, and the state at that position is used to determine whether the result of the addition is positive or negative.

According to the above construction, besides the addition/subtraction circuit, obtained is the bit number of successive zeros or ones from the most significant bit resulting from the mantissa addition/subtraction. In detail, the number of successive zeros is obtained when the result of mantissa addition/subtraction is positive and the number of successive ones in 2's complement notation is obtained when the result of mantissa addition/subtraction is negative.

Another prior art (second conventional example) is disclosed in U.S. patent application Ser. No. 07/825,999 to Miyoshi et al., which is discussed with reference to drawings.

FIG. 9 is a block diagram of a leading one detection circuit in the second conventional example. Reference numeral 804 in the figure indicates a one-bit element of a leading one detection circuit.

A minuend X and a subtrahend Y are inputted to a redundant binary numeral generator 901 per a bit to generate a redundant binary numeral Zsd. Referring to a k-th bit, the redundant binary numeral generator 901 performs a subtraction (minuend Xk−subtrahend Yk) and outputs the redundant binary numeral Zsdk=1, 0 or −1. Then Zsdk is inputted into an intermediate-carry/intermediate-sum generator 902 to generate an intermediate sum Sk and an intermediate carry Ck according to a rule in Table 1, with reference to a 1-bit upper redundant binary numeral Zsdk+1.

TABLE 1

| Zsdk + 1 | Zsdk | Ck | Sk |
| --- | --- | --- | --- |
| 1 | 1 | 1 | −1 |
| 1 | 0 | 0 | 0 |
| 1 | −1 | −1 | 1 |
| 0 | 1 | 0 | 1 |
| 0 | 0 | 0 | 0 |
| 0 | −1 | 0 | −1 |
| −1 | 1 | 1 | −1 |
| −1 | 0 | 0 | 0 |
| −1 | −1 | −1 | 1 |

Then, a scan-value generator 903 generates a scan value Zk, using the intermediate sum Sk and the intermediate carry Ck-1 from a 1-bit lower bit, according to a rule in Table 2.

TABLE 2

| Ck − 1 | Sk | Zk |
| --- | --- | --- |
| 1 | 1 | 1 |
| 1 | 0 | 1 |
| 1 | −1 | 0 |
| 0 | 1 | 1 |
| 0 | 0 | 0 |
| 0 | −1 | 1 |
| −1 | 1 | 0 |
| −1 | 0 | 1 |
| −1 | −1 | 1 |

At this time, the number of zeros till a leading one from the most significant bit of Z is indicative of a bit shift amount at a normalization or a 1-bit less amount thereof. Therefore the bit shift amount or 1-bit less amount thereof at the normalization can be obtained by inputting Z to a priority encoder. In addition, according to the above construction, besides the addition/subtraction circuit, the bit shift amount or the 1-bit less amount thereof at the normalization is obtained regardless of whether the result of mantissa subtraction is positive or negative.

FIG. 10 is a block diagram of a mantissa calculation part in a floating point addition/subtraction apparatus using the leading one detection circuit in the second conventional example. When a subtraction is performed with respect to two floating point data X, Y each having a mantissa part, an exponent part and a sign part, a digit alignment, a mantissa addition/subtraction and a normalization are performed in this order. Discussed below is the floating point addition/subtraction apparatus using the leading one detection circuit in the second conventional example in FIG. 10.

The digit alignment is performed as below. Exponent parts (Xe, Ye) of two operands are inputted into a subtraction circuit 305, a shift signal generator 304 and a selector 306. At the same time, mantissa parts (1.Xf or 0.Xf, 1.Yf or 0.Yf) of the two operands are inputted into a right/left shifter 301 which shifts the mantissa parts right or left by one bit. The subtraction circuit 305 performs a subtraction with respect to the exponent values Xe, Ye to produce an absolute value and a sign value of (Xe−Ye). At the same time, the shift signal generator 304 detects whether the individual inputted operands are normalized numbers and generates control signals required for shifting respective mantissa values of the two inputted operands right or left, using respective sign values (Xs, Ys) of the operands and a subtraction signal SUB. Based on the control signals from the shift signal generator 304, the right/left shifter 301 shifts the two mantissa values of the operands right or left. Outputs from the right/left shifter 301 are inputted into a swap circuit 302 in which they are swapped in accordance with the sign value of (Xe−Ye) outputted from the subtraction circuit 305 so that the mantissa value of the one operand having an exponent value not greater than that of the other operand is inputted into a right barrel shifter 303 whereas the mantissa value of the latter having a greater exponent value is inputted into an addition/subtraction circuit 307. The right barrel shifter 303 shifts right the inputted value by the absolute value of (Xe−Ye), which is indicative of the difference between the two exponent values of the operands and is outputted from the subtraction circuit 305. The digit alignment is performed in this way.

Secondly, the addition/subtraction circuit 307 performs an addition/subtraction processing and a rounding processing.

Thirdly, normalization processing is explained. In parallel with the second step of the addition/subtraction processing and the rounding processing, the bit-discard amount is anticipated using a leading one detection circuit 311 and a priority encoder 308. The anticipated bit-discard amount is outputted from the priority encoder 308 as Zae.

A left barrel shifter 309 shifts left the output value of the addition/subtraction circuit 307, using the anticipated bit-discard amount Zae outputted from the priority encoder 308, and outputs it. At the same time, the left barrel shifter 309 also outputs a value 1-bit upper than the radix point to a signal line L1. The signal line L1 is "0" when the left shifted value is not normalized, and "1" when the left shifted value is normalized. When the signal line L1 is 0, the anticipated bit-discard amount Zae is 1-bit less than the actual amount, which requires 1-bit left shift. This shift is performed in an alignment circuit 312.

At the same time, the anticipated bit-discard amount Zae is inputted into a subtraction circuit 310, which concurrently performs two subtractions (Ze′−Zae) and (Ze′−Zae−1) to output results to data lines L2, L3. A selector 313 outputs the result of subtraction Ze′−Zae when the value of the signal line L1 is "0" and the result Ze of subtraction of Ze′−Zae−1 when the value thereof is "1" to perform the normalization processing.

In the first conventional example, the number of successive ones from the most significant bit in the 2's complement notation is obtained in case where the result of mantissa addition/subtraction is negative. However, in general, the mantissa value is expressed in an absolute value notation in a floating point format. Therefore, at the conversion, there is a possibility of a 1-bit error caused between the number of successive ones and the bit shift amount at the normalization.

In the second conventional example, the bit shift amount outputted means the bit shift amount at the normalization or a bit shift amount 1-bit less than the bit shift amount at the normalization, which requires to modify the 1-bit error, in addition to a digit alignment of the result of mantissa subtraction with the obtained bit shift amount.

SUMMARY OF THE INVENTION

The present invention has its objects of providing a leading one anticipator capable of anticipating accurately the bit shift amount at the normalization regardless of whether the result of subtraction is positive or negative in parallel with or prior to the mantissa subtraction and of providing a floating point addition/subtraction apparatus capable of high-speed calculation employing a leading one anticipator of the above-described type. This apparatus can simultaneously perform a mantissa subtraction and an accurate anticipation of the bit shift amount at the normalization.

To attain the above objects, a leading one anticipator in the present invention comprises: first means for generating an anticipated bit-discard amount within a 1-bit error; second means for generating information on borrow propagation from a lower bit side; third means for handling the anticipated bit-discard amount, using the borrow propagation information, wherein a selector outputs an accurate bit shift amount for normalization based on an anticipated bit-discard amount according to the presence of the borrow. Using the leading one anticipator with the above construction, a bit-discard amount resulting from a mantissa subtraction is accurately anticipated regardless of whether the result of subtraction is positive or negative in parallel with or prior to the mantissa subtraction. In other words, according to the present invention, an accurate bit shift amount required at an addition-normalization operation is obtained, thus omitted is processes, at a normalization of a result of addition, of performing a digit alignment with the bit shift amount outputted from the conventional leading one anticipator and of shifting by one bit when the most significant bit is 0.

Further, a floating point addition/subtraction apparatus in the present invention is so composed that: in an addition/subtraction circuit for mantissa values of a floating point calculation, two operands of mantissa values after digit alignment is inputted concurrently into the addition/subtraction circuit and the above leading one anticipator, a result of subtraction performed in the addition/subtraction is inputted into a barrel shifter and wherein the result of subtraction inputted in said barrel shifter is shifted, using a bit shift amount outputted from the leading one anticipator. According to the concurrent operation of the leading one anticipator in the present invention with a mantissa subtraction, the result of mantissa subtraction is obtained and the result of mantissa subtraction is normalized, using an anticipated value of bit-discard amount at the same time. This leads to a high-speed floating point addition/subtraction apparatus.

DETAILED DESCRIPTION OF PREFERRED EMBODIMENTS

Figure 1:
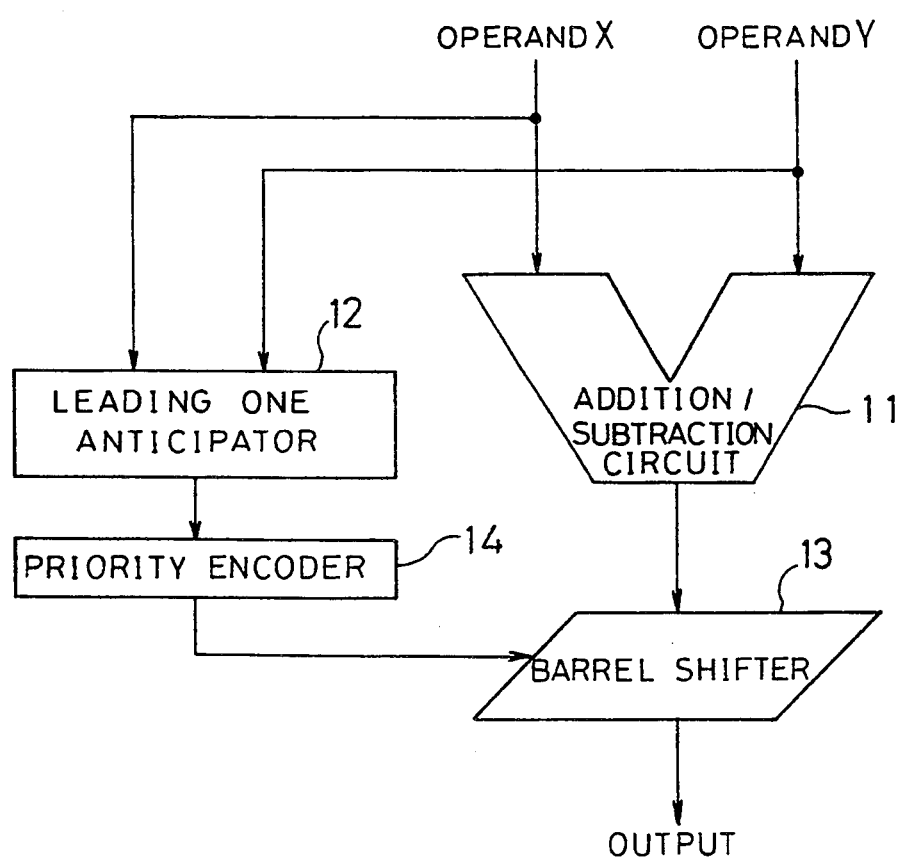
FIG. 1 is a view showing a construction of a mantissa addition circuit in an embodiment of the present invention.

A leading one anticipator and a floating point addition/subtraction apparatus according to the preferred embodiments of the present invention are schematically described first, comparing with the second conventional example.

In the second conventional example, there are cases of correctly indicating a bit shift amount and of indicating a value one-bit less than the bit shift amount at a normalization. These cases are exemplified in detail.

Suppose, for example, that each bit number of input data of a minuend and a subtrahend is 8. A subtraction (a minuend X (7:0) — a subtrahend Y (7:0)) is performed. In case where the leading scan value $Zk=1$ is at the third bit as the least significant bit is a zeroth bit when $X>Y$, it is expressed as:

Z=00001 aaa:a=0 or 1

In this case, suppose that a difference $S(7:0)=X(7:0)-Y(7:0)$, a maximum value of the difference S is maxS1 and a minimum value thereof is minS1:

maxS1=00001111 minS1=00000101

Suppose that a maximum value and a minimum value for indicating a correct bit shift amount are respectively maxS2 and minS2, and a maximum value and a minimum value for indicating a bit shift amount 1-bit less than the actual bit shift amount are respectively maxS3 and minS3:

maxS2=00001111 minS2=00001000 maxS3=00000111 minS3=00000101

As is known therefrom, the case indicating the 1-bit less bit shift amount means a case where a subtraction $X(2:0)-Y(2:0)$ with bits lower than the 1-bit lower bit ($k=2$ in this case when k at the least significant bit is 0) of a bit at a leading $Zk=1$ ($k=3$ in this case) results in a negative value.

Similarly, when $Y>X$, it corresponds to a case where a result of the subtraction $X(2:0)-Y(2:0)$ is positive.

In this example, the input data have 8 bits. In the second conventional example, however, it is clear that with the input data having arbitrary bits, the 1-bit less bit shift amount is indicated when a result of subtraction of lower bits of the 1-bit lower bit of a bit at the leading $Zk=1$ is:

$X(k-1:0)-Y(k-1:0)<0$ when $X>Y$ $X(k-1:0)-Y(k-1:0)>0$ when $Y>X$

In the present invention, when a 1-bit less bit shift amount as described above is indicated, the 1-bit less bit shift amount is modified to a correct bit shift amount at a normalization and outputted.

In detail, using information of:
1) $X>Y$
2) $Y>X$
3) $X(k-1:0)>Y(k-1:0)$
4) $Y(k-1:0)>X(k-1:0)$ a position of a leading scan value $Zk=1$ from the most significant bit in the second conventional example is modified and outputted, so that a correct bit shift amount at the normalization is outputted regardless of whether the result of subtraction is positive or negative.

To obtain the information of the four cases, first, a redundant binary numeral ZZk is produced according to Table 3 for distinguishing 1) $X>Y$ from 2) $Y>X$, instead of producing a scan value Zk in the binary form generated in the second conventional example.

TABLE 3

| Ck − 1 | Sk | ZZk |
| --- | --- | --- |
| 1 | 1 | 1 |
| 1 | 0 | 1 |
| 1 | −1 | 0 |
| 0 | 1 | 1 |
| 0 | 0 | 0 |
| 0 | −1 | −1 |
| −1 | 1 | 0 |
| −1 | 0 | −1 |
| −1 | −1 | −1 |

Accordingly, when a leading ZZk≠0 is 1, 1) $X>Y$, and when ZZk=−1, 2) $Y>X$. When ZZk=0, this means Zk=0 and when ZZk≠0, this means Zk=1 in the second conventional example.

Described next is how to obtain information on difference relation between $X(k-1:0)$ and $Y(k-1:0)$.

Suppose that $X(k-1:0)<Y(k-1:0)$, for example, $X(k-1:0)-Y(k-1:0)<0$ resulting from a subtraction $X(n:0)-Y(m:0)$ ($n \geq k$, $m \geq k$), so that a digit borrow (borrow Bx(k)) is caused at a digit of X(k). Similarly, suppose that $X(k-1:0)>Y(k-1:0)$, $Y(k-1:0)-X(k-1:0)<0$ resulting from the subtraction Y(m:0)−X(n:0), so that a digit borrow (borrow By(k)) is caused at a digit of Y(k). Whereupon, in the present invention, the information on the difference relation between X(k−1:0) and Y(k−1:0) is obtained by employing a borrow propagator and producing Bx(k) and By(k).

Further, a selector is provided for increasing by one the number of successive ZZk=0 till a leading ZZk≠0 from the most significant bit in cases of combinations of 1) X>Y and 4) Y(k−1:0)>(X(k−1:0) and of 2) Y>X and 3) X(k−1:0)>Y(k−1:0). With these operations, in the present invention, the accurate bit shift amount at the normalization is obtained regardless of whether the result of subtraction is positive or negative. Thereafter, the output is inputted into a priority encoder to obtain a bit shift amount for normalization of the result of subtraction.

Using the bit shift amount, a barrel shifter shifts the result of mantissa subtraction in binary absolute value notation, so that the mantissa subtraction and the normalization is completed.

Description is made below, with reference to the drawings.

FIG. 1 shows a construction of an addition circuit for mantissa values, using the leading one anticipator in the present invention. In FIG. 1, reference numeral 11 indicates an addition/subtraction circuit for performing an addition of mantissa values and outputting an absolute value, 12 indicates the leading one anticipator having the construction of the present invention for anticipating a bit-discard amount. 13 indicates a barrel shifter for shifting a mantissa value for normalization, 14 indicates a priority encoder.

Figure 2:
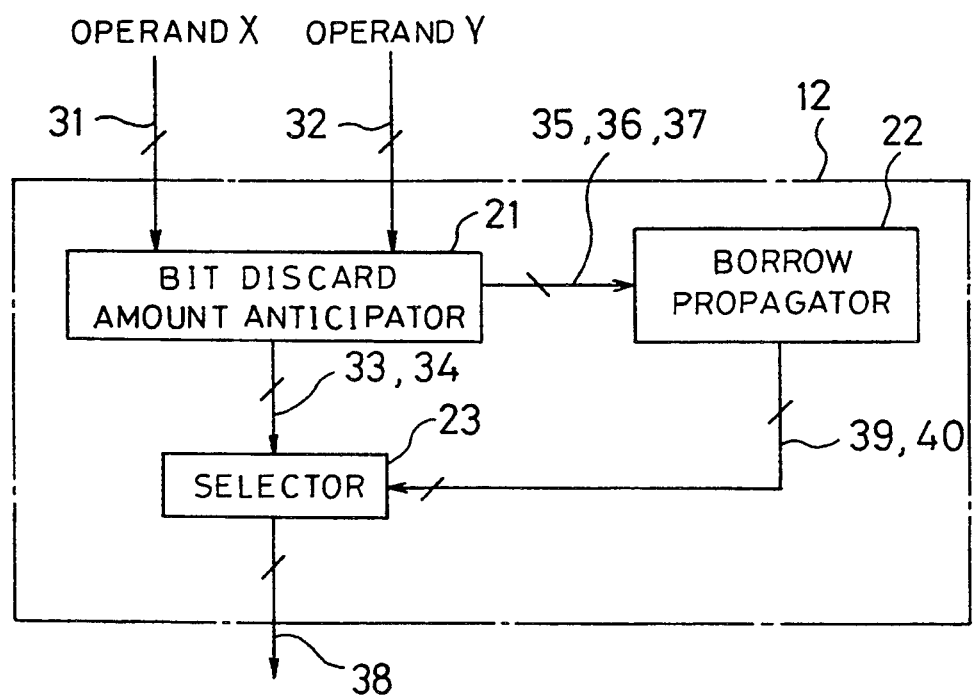
FIG. 2 is a block diagram of a leading one anticipator in the embodiment.

FIG. 2 is a block diagram of the leading one anticipator 12 of the present invention where an input operand has 8 bits. In FIG. 2, reference numeral 21 indicates a bit-discard amount anticipator for anticipating a bit-discard amount within a 1-bit error, besides the addition/subtraction circuit 11. The bit-discard amount anticipator 21 outputs the scan value ZZk=1, 0, or −1 which are redundant binary numerals. 22 indicates a borrow propagator for outputting a borrow propagation from a lower bit, besides the addition/subtraction circuit 11. The borrow propagator 22 outputs the above described borrows Bx(k), By(k) with respect to an arbitrary "k". 23 indicates a selector for handling a bit shift amount required at the normalization, using an output from the bit-discard amount anticipator 21 according to an output from the borrow propagator 22.

Figure 3:
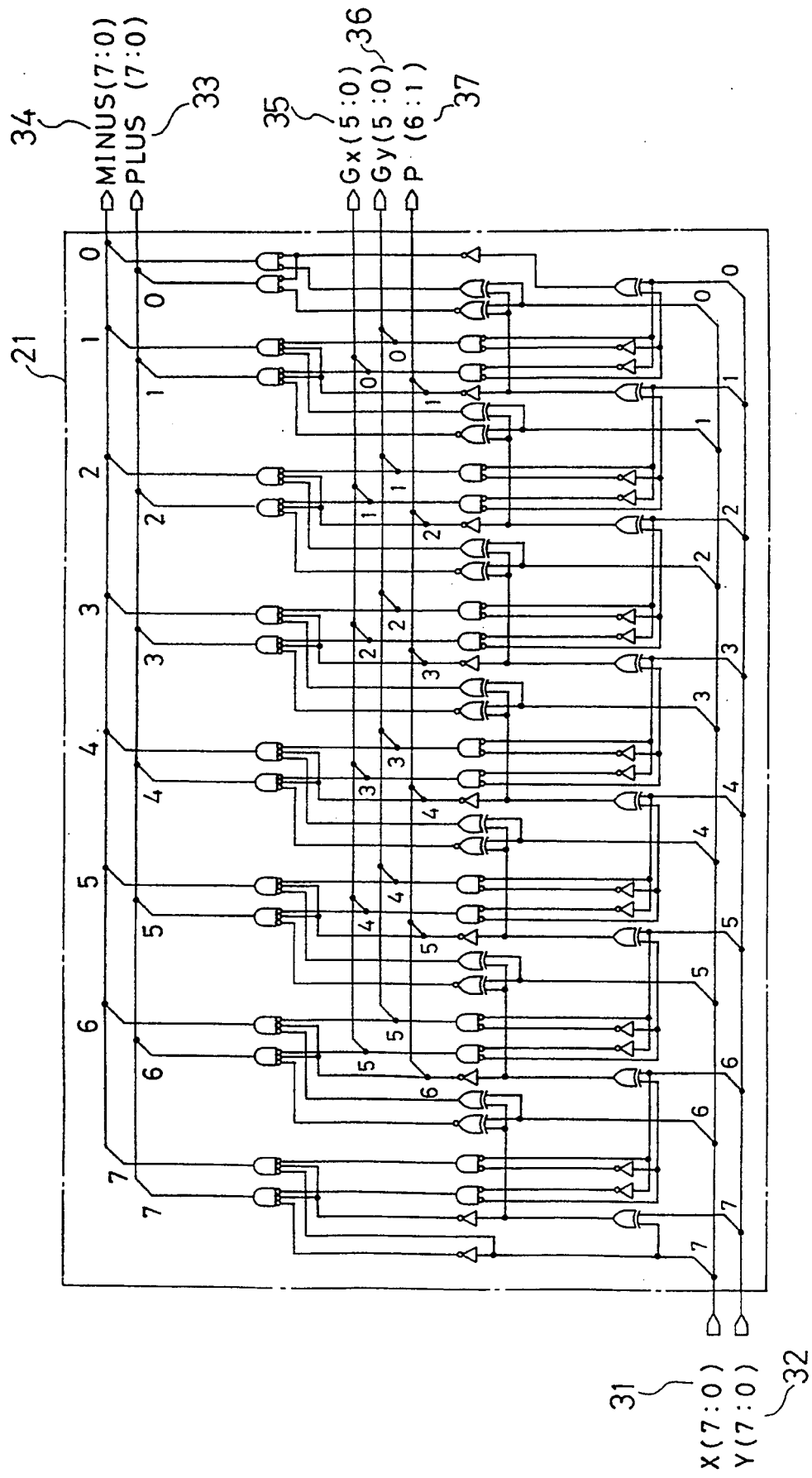
FIG. 3 is a detail view of a bit-discard amount anticipator in the embodiment.

FIG. 3 is a detail of the bit-discard amount anticipator 21 in the form of gate connection. In FIG. 3, reference numeral 31 and 32 are 8-bit input operands. PLUS 33 and MINUS 34 are signal lines for outputting a scan value ZZk as PLUS=1 and MINUS=0 when ZZk=1, as PLUS=0 and MINUS=0 when ZZk=0 and as PLUS=0 and MINUS=1 when ZZk=−1. There exists no state that PLUS=1 and MINUS=1. A bit number of successive zeros till a leading ZZk=≠0 from the most significant bit, i.e. the number of successive PLUS="0" or successive MINUS="0" till the leading PLUS="1" or MINUS="1" from the most significant bit means a bit-discard amount without consideration of the borrow from a lower bit. When a numeral ZZk other than the leading ZZk=0 is 1, the result of mantissa subtraction is positive. When ZZk=−1, the result of mantissa subtraction is negative.

Gx 35, Gy 36 and P 37 are bit lines with respect to each bit for outputting information to the borrow propagator 22. Gx 35 indicates (NOT operand X) AND (operand Y), i.e. (Xk, Yk)=(0, 1). Gy 36 indicates (operand X) AND (NOT operand Y), i.e. (Xk, Yk)=(1, 0). P 37 indicates (operand X) XNOR (operand Y), i.e. (Xk, Yk)=(0, 0) or (1, 1). Gx(n) 35 is a signal indicative of a borrow generation at an n-th bit of the operand X. Gy(n) 36 is a signal indicative of a borrow generation at the n-th bit of the operand Y. P(n) 37 is a signal which propagates a borrow from a lower bit. Gx(n) 35 and Gy(n) 36 do not require a sixth bit because a sixth bit is already considered in a redundant binary subtraction at a seventh bit.

Figure 4:
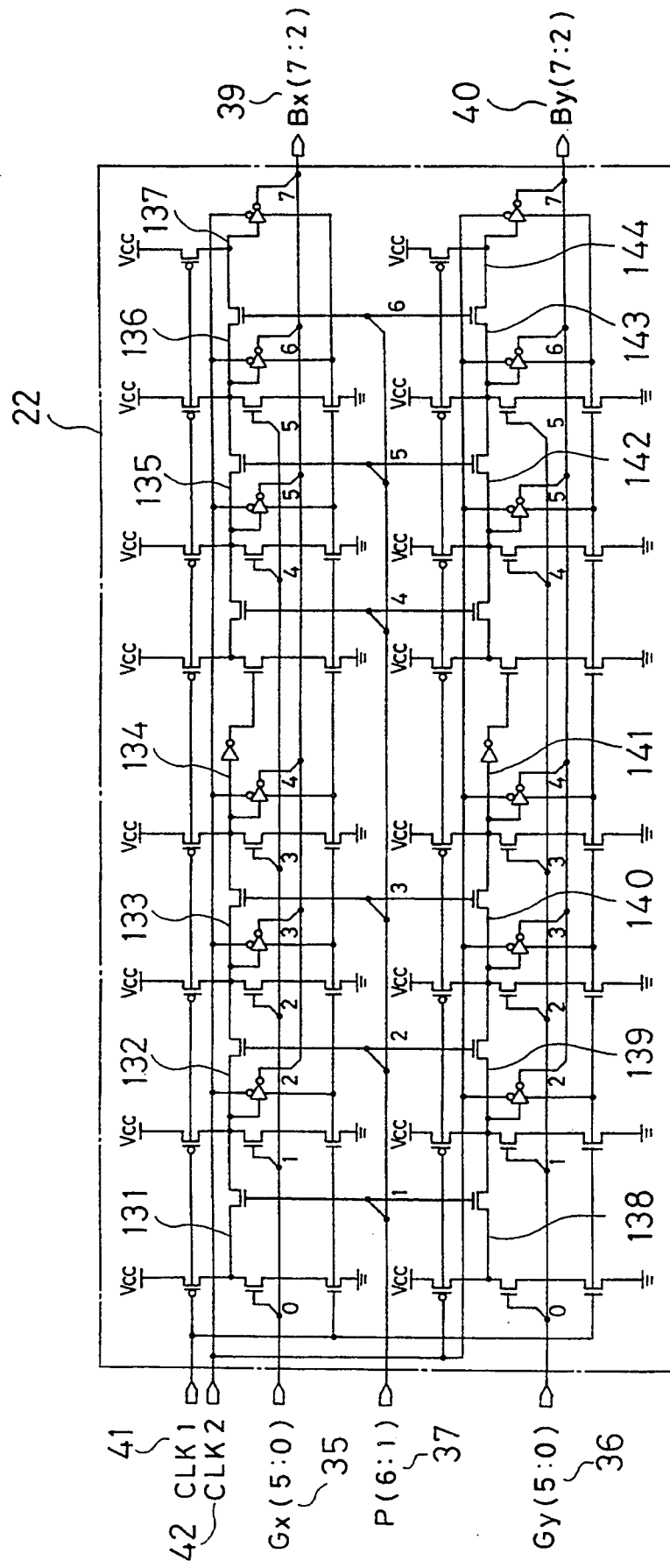
FIG. 4 is a detail view of a borrow propagator in the embodiment.

FIG. 4 shows the borrow propagator 22 in the form of gate connection. In FIG. 4, reference numeral 41 indicates an input of clock (clock 1) from outside for precharging and discharging precharge lines and outputting values of the precharge lines. 42 indicates an input of clock (clock 2) for outputting values of the precharge lines, which has an inverted phase of that of the clock 1. 131 through to 144 are the precharge lines to be precharged when the clock 1 is "0" and discharged when the clock 1 is "1" and a path to a ground is open. Bx 39 is a signal indicating that a borrow from the operand X is propagated to the n-th bit. By 40 is signal indicating a borrow from the operand Y is propagated to the n-th bit. Both Bx 39 and By 40 do not require a zeroth bit and a first bit because there is no borrow which is propagated to the zeroth bit and a borrow which is propagated to the first bit is already considered at a production of ZZk.

In general, the borrow propagation is expressed in a formula (1).

$$B(n) = G(n) + P(n)*G(n-1) = \\ G(n) + P(n)* \{P(n-1)*G(n-2) + \\ P(n-1)*P(n-2)*G(n-3) + \ldots \} \quad (1)$$

A precharge line corresponding to a bit at which the formula (1) is met is discharged when the clock 1 is "1". Thereby, the discharged bit has a borrow from the lower bit, so that the bit having the borrow from the lower bit can be set by outputting through an inverter an output of the inverter. However, using a tri-state inverter which is in high-impedance when the clock 1 is "0", the state where the clock signal is "1" can be maintained when the clock signal is "0", utilizing a stray capacity of a wiring capacity and the like.

Figure 5:
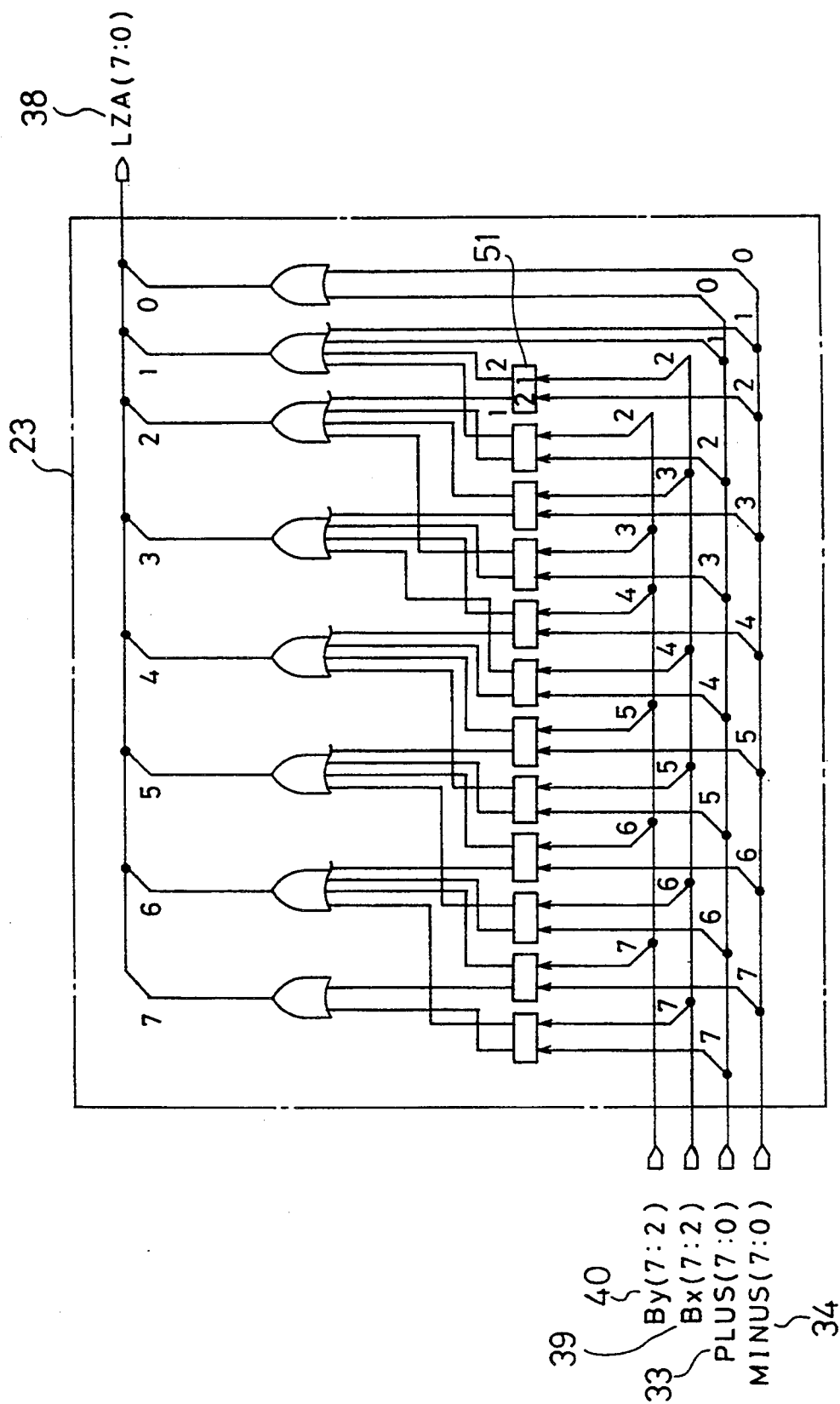
FIG. 5 is a detail view of a selector in the embodiment.

FIG. 5 shows the selector 23 in detail. In FIG. 5, reference numeral 51 indicates a demultiplexer for selecting a bit shift amount at a normalization under the control of information of terminals of Bx 39 and By 40 from the borrow propagator 22, i.e. Y(k−1:0)>X(k−1:0) and X(k−1:0)>Y(k−1:0) based on terminals of PLUS 33 and MINUS 34 of the bit-discard around anticipator 21, i.e. whether ZZk=1, 0 or −1.

Figure 6:
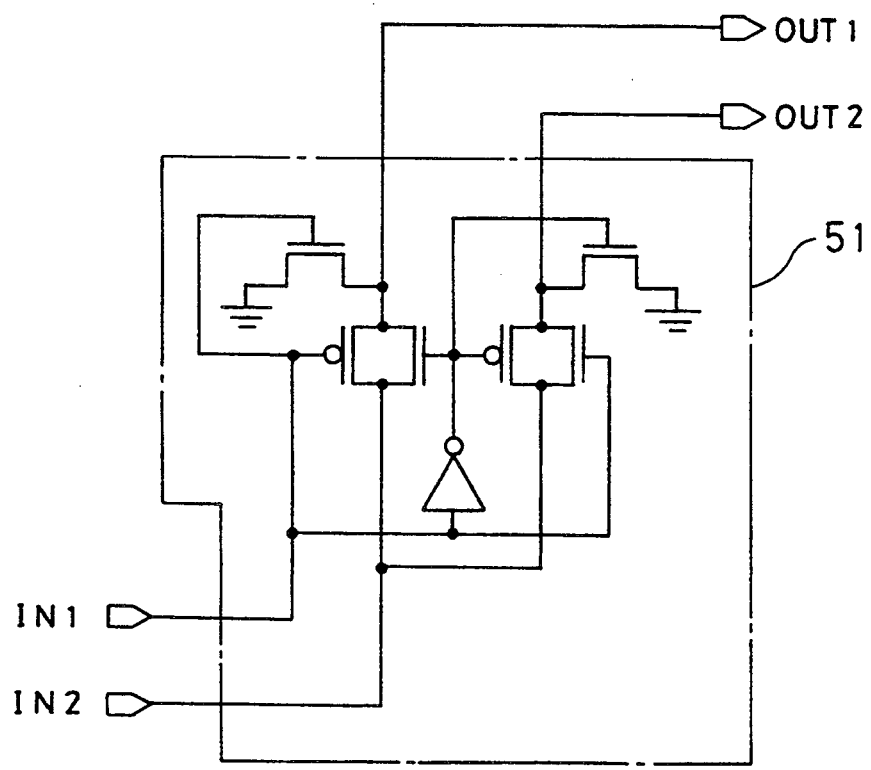
FIG. 6 is a detail view of a demultiplexer in the embodiment.

FIG. 6 shows the demultiplexer 51 in the form of transistor connection. A position of PLUS(k) is outputted to the terminal of PLUS(k) 33 directly as LZA(k) when the terminal of Bx(k) from the borrow propagator 21 is "0", and the position of PLUS(k) is modified to a 1-bit lower bit and outputted as LZA(k−1) when the terminal of Bx(k) therefrom is "1". Similarly, A position of MINUS(k) is outputted to the terminal of MINUS(k) 34 directly as LZA(k) when the terminal of By(k) 37 from the borrow propagator 22 is "0", and the position of MINUS(k) is modified to the one-bit lower bit and outputted as LZA(k−1) when the terminal of Bx(k)

therefrom is "1". This means that the bit-discard amount is modified to one-bit greater amount when a borrow from the lower bit is present in the output from the bit-discard anticipator 21, namely when 1) X>Y and 4) Y(k−1:0)>X(k−1:0) or when 2) Y>X and 3) X(k−1:0)>Y(k−1:0). The outputted LZA (7:0) is inputted into the priority encoder to count the number of successive zeros from the most significant bit, the result of which is the bit shift amount at the normalization.

Operation based on the above construction is described next. As an example, suppose that the 8-bit operands X(7:0)=11010100, Y(7:0)=11001101 as inputs after mantissa value digit alignment are inputted as X(7:0)−Y(7:0). Firstly, the operands X(7:0)=11010100, Y(7:0)=11001101 are inputted into the bit-discard amount anticipator 21. In an actual binary subtraction, the difference S is S(7:0)=00000111. The bit-discard amount anticipator 21 produces a scan value ZZk in the redundant binary form, with a result that PLUS(7:0) 33=00001000, MINUS(7:0) 34=00000001, i.e. ZZk=0000100T (T=−1) is outputted. It is known that at this state, X>Y since the leading ZZk≠0 from the most significant bit is 1.

As outputs to the borrow propagator 22, Gx(5:0) 35=001001 indicating a bit having a possibility of a borrow resulting from the operand X, Gy(5:0) 36=010000 indicating a bit having a possibility of a borrow resulting from the operand Y and P(6:1) 37=110011 indicating a borrow propagation are outputted.

Next, the precharge lines 131-144 are precharged when the clock 1 is "0" in the borrow propagator 22, and the above-described Gx(5:0) 35=001001, Gy(5:0) 36=010000 and P(6:1) 37=110011 are inputted when the clock is "1". Thereby, paths from the precharge lines 131, 132, 133, 134, 142, 143, 144 to the ground is formed for discharge. At this state, when the clock 2 becomes "0", Bx(7:2) 39=000111, By(7:2) 40=111000 are outputted from the terminal of the borrow propagator 22. Namely, the leading ZZk≠0 at ZZ(4) from the most significant bit, and X>Y because ZZk=1. At this time, Bx(4)=1, which means the case which requires to increase by 1 bit the number of successive zeros till the leading ZZk≠0 from the most significant bit.

Next, when PLUS(7:0) 33=00001000, MINUS(7:0) 34=00000001 (i.e. ZZ(7:0)=(0000100T) (T=−1)), Bx(7:2) 39=000111, and By(7:2) 40=111000 are inputted into the selector 23, LZA(7:0) 38=00000101 is outputted. In LZA(7:0)=00000101, zero continues 5 bits from the most significant bit till the leading one, which means that the bit shift amount at the normalization is 5. Accordingly, by inputting the result into the priority encoder 24 which watches the result from the most significant bit, a decoded bit shift signal "101" at normalization which is to be inputted into the barrel shifter is obtained. The binary numeral "101" means 5 in a decimal notation.

In this example, the case of X(7:0)>Y(7:0) is described. However, the same effect is obtained in case of Y(7:0)>X(7:0). In this embodiment, the leading one anticipator is independent from the mantissa addition/subtraction circuit, but the borrow propagator can be omitted when the borrow propagator is commonly used with the mantissa addition/subtraction circuit. The leading one anticipator may be of any-bit construction other than 8-bit construction.

In case where the present invention is applied to a system in which it is known which of a minuend or subtrahend is greater than the other, the result of subtraction is necessarily positive or negative. Accordingly, the bit-discard amount anticipator with signs is exchangeable to a mere bit-discard amount anticipator, and an apparatus for generating information from which operand a borrow is caused is exchangeable to an apparatus for propagating only a borrow caused from a smaller operand of the minuend and the subtrahend.

Further, in this embodiment, the redundant binary notation is used in the process for obtaining the number of successive zeros from the most significant bit resulting from the mantissa subtraction, but only binary numeral may be used without introducing the redundant binary notation.

Figure 7:
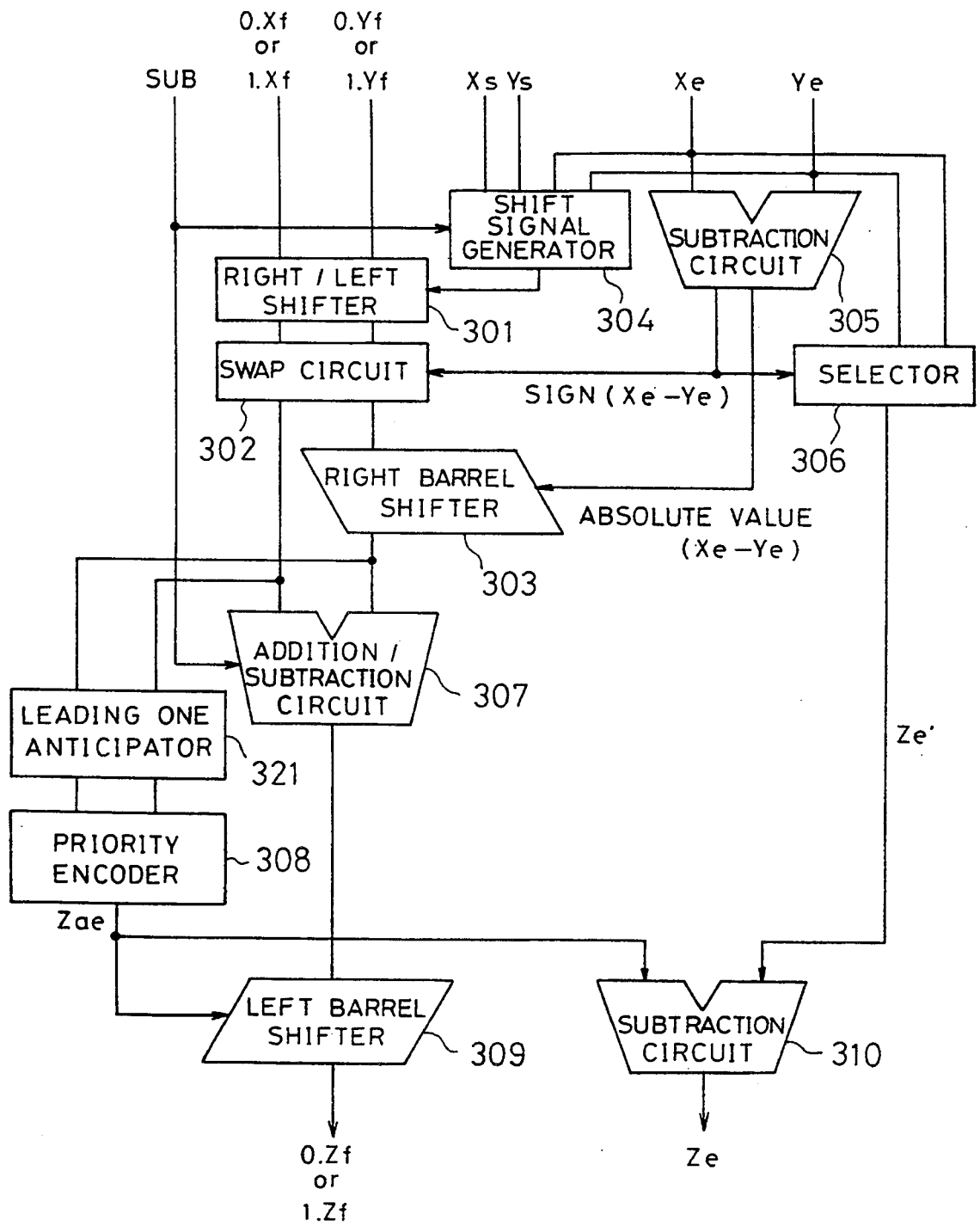
FIG. 7 is a block diagram of a floating point addition/subtraction apparatus in another embodiment of the present invention.
Figure 8:
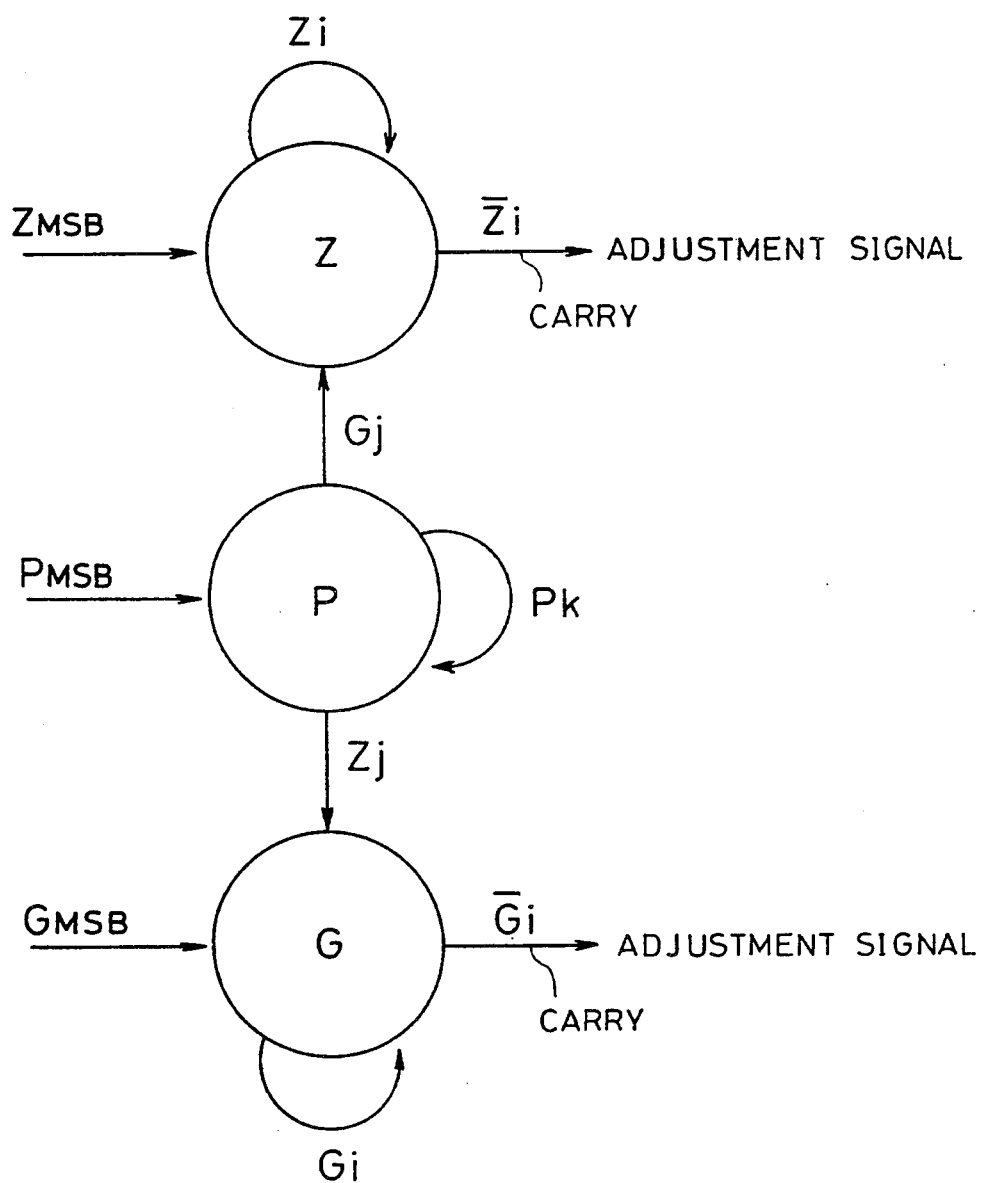
FIG. 8 is a view of a simple algorithm of a leading zero anticipator in the first conventional example.
Figure 9:
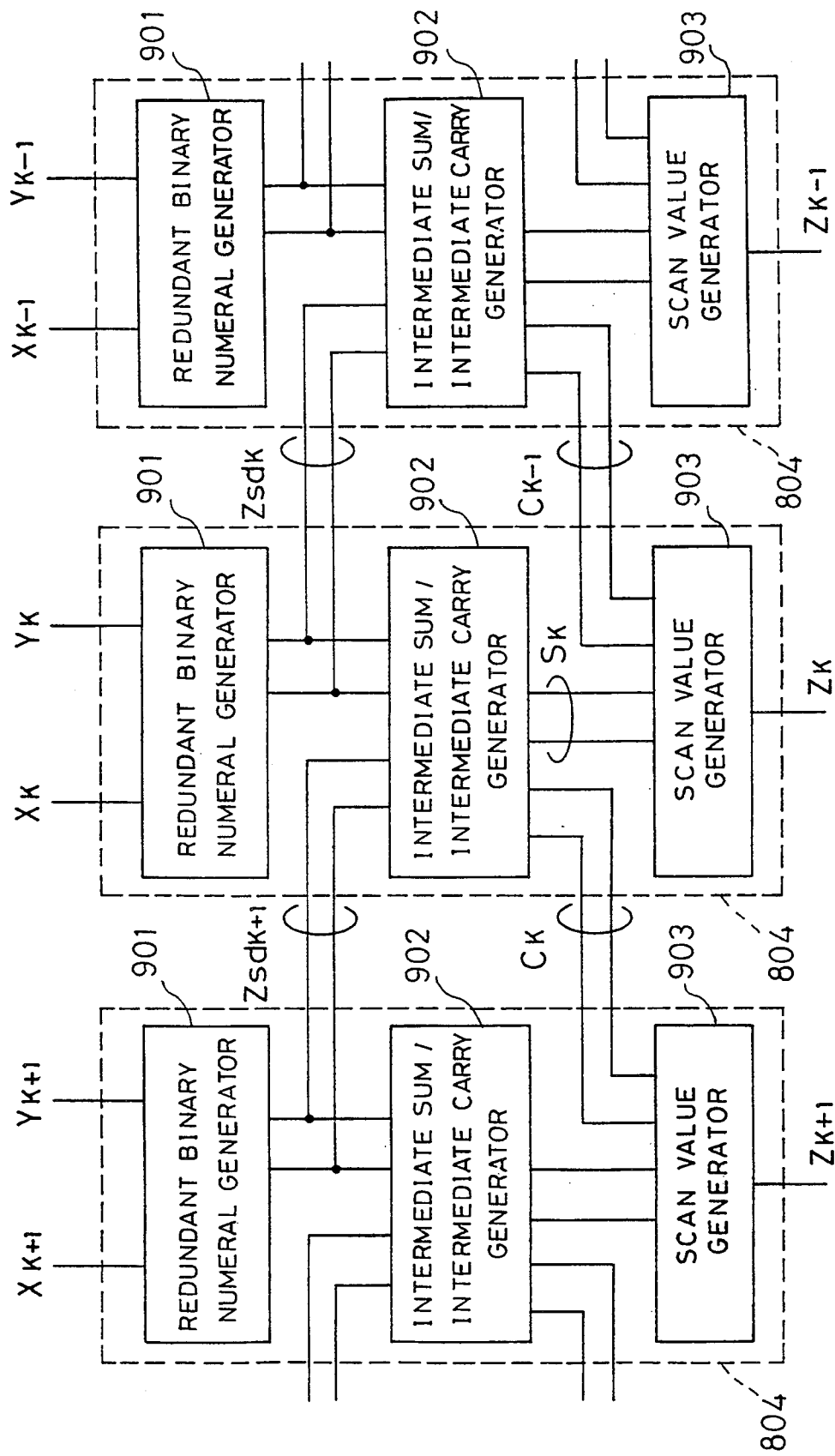
FIG. 9 is a block diagram of a leading one detection circuit in the second conventional example.
Figure 10:
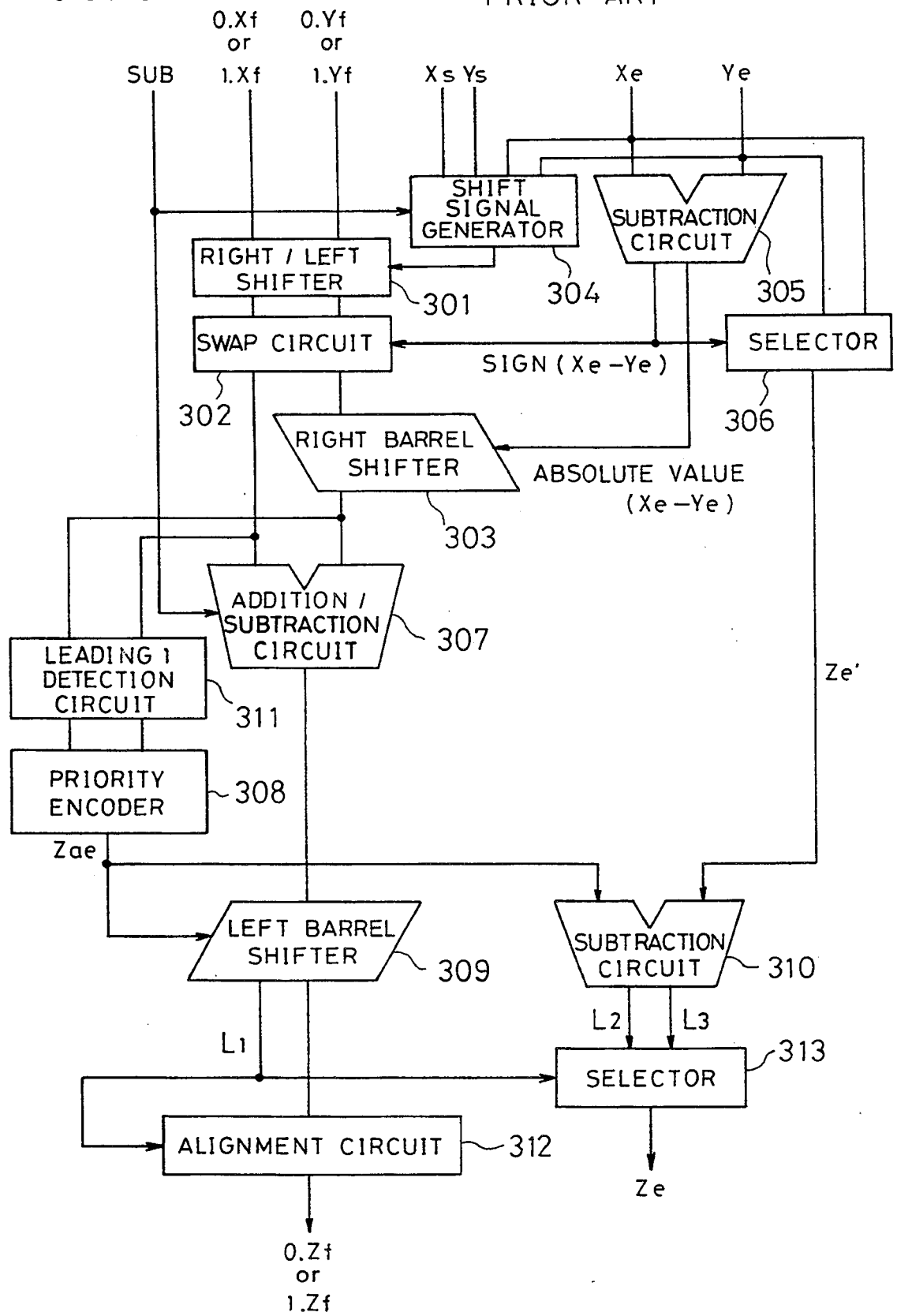
FIG. 10 is a block diagram of a floating point addition/subtraction apparatus in the second conventional example.

FIG. 7 is a block diagram of a mantissa calculation part of a floating point addition/subtraction apparatus using the above leading one anticipator. As well as the second conventional example, the digit alignment, the mantissa addition/subtraction and the normalization are performed in this order with respect to the two floating point data X, Y each having the mantissa part, the exponent part and the sign part.

Description is made below, exemplifying the floating point addition/subtraction apparatus using the leading one anticipator in the present invention shown in FIG. 7. The digit alignment and the mantissa addition/subtraction are performed in the same manners as in the second conventional example. The description of first and second part is already described in the description of the prior art. The same processings heretofore are conducted in the same manner as in the second conventional example. As to a mantissa value, a left barrel shifter 309 shifts left the output of the addition/subtraction circuit 307, using the bit-discard amount Zae anticipated based on the output of the leading one anticipator 321 of the present invention and output it, thus completing the normalization. As to the exponent value, the anticipated bit-discard amount Zae is inputted into the subtraction circuit 310 to perform the subtraction Ze'−Zae=Ze and to output Ze, thus completing the normalization.

I claim:

1. A leading one anticipator, comprising:
   first means for generating an anticipated bit-discard amount within a 1-bit error;
   second means for generating information on borrow propagation from a lower bit side;
   third means for handling the anticipated bit-discard amount, using the borrow propagation information,
   wherein said third means outputs a bit shift amount for normalizing a mantissa value in which the bit-discard occurs based on an anticipated bit-discard amount obtained by said first means according to the presence of the borrow.

2. A leading one anticipator, comprising:
   first means for generating an anticipated bit-discard within a 1-bit error and outputting whether a result of addition/subtraction instruction is positive or negative;
   second means for generating information on borrow propagation from a lower bit side, distinguishing into two kinds of a borrow resulting from a subtraction (a minuend−a subtrahend) and a borrow resulting from a subtraction (a subtrahend−a minuend); and third means for handling the anticipated bit-discard amount, using the information on borrow propagation, wherein said third means outputs a bit shift amount for normalizing a mantissa value in which the bit-discard occurs based on an anticipated bit-discard amount obtained by said first means according to the presence of borrow resulting from the subtraction that the minuend − the subtrahend when a result of subtraction is positive and according to the presence of borrow resulting from the subtraction that the subtrahend − the minuend when a result of subtraction is negative.

3. The leading one anticipator as claimed in claim 2, wherein:

said first means subtracts per a digit a minuend X of i-digit binary numeral and a subtrahend Y of j-digit binary numeral (i and j are natural numerals) and generates a redundant binary numeral Zsd each digit of which is composed of (−1, 0, 1) as a result of subtraction;

said second means generates an intermediate carry Ck and an intermediate sum Sk according a formula $Zsdk = 2Ck + Sk$ so that $Ck = Zsdk$ when $Zsdk + 1 = $ "1" or "−1" and $Ck = 0$ when $Zsdk + 1 = $ "0", using a redundant binary numeral Zsdk at a k-bit lower bit than the redundant binary numeral Zsd and a redundant binary numeral $Zsdk + 1$ at a (k+1)-bit lower bit than the redundant binary numeral Zsd (k is an integer wherein a least significant bit is expressed as $k = 0$); and said third means generates a redundant binary numeral ZZk which is "0" when a result of addition per a digit of an intermediate carry Ck-1 from a lower digit and an intermediate sum Sk is 0, "1" when the result of addition is 1 and "−1" when the result of addition is −1.

4. A floating point addition/subtraction apparatus for performing an addition or a subtraction of two operands of the floating point type each having a mantissa part, an exponent part and a sign part, comprising:

an addition/subtraction circuit and a leading one anticipator into which two operands of mantissa values after digit alignment are input, respectively;

a barrel shifter into which an output of said addition/subtraction circuit is input; and a priority encoder, into which a numeral value output from said leading one anticipator is input, for obtaining a number of successive zeros from a most significant bit thereof, wherein an output of said addition/subtraction circuit input into said barrel shifter is shifted and outputted using an output of said priority encoder;

said leading one anticipator comprising: first means for generating an anticipated bit-discard amount within a 1-bit error; second means for generating information on borrow propagation from a lower bit side; and third means for handling the anticipated bit-discard amount, using the borrow propagation information, wherein said third means outputs a bit shift amount for normalizing a mantissa value in which the bit-discard occurs based on an anticipated bit-discard amount obtained by said first means according to the presence of the borrow.

5. A floating point addition/subtraction apparatus for performing an addition or subtraction of two operands of the floating point type each having a mantissa part, an exponent part and a sign part, comprising:

an addition/subtraction circuit and a leading one anticipator into which two operands of mantissa values after digit alignment are input, respectively;

a barrel shifter into which an output of said addition/subtraction circuit is input; and a priority encoder, into which a numeral value output from said leading one anticipator is input, for obtaining a number of successive zeros from a most significant bit thereof, wherein an output of said addition/subtraction circuit input into said barrel shifter is shifted and outputted using an output of said priority encoder;

said leading one anticipator comprising: first means for generating an anticipated bit-discard within a 1-bit error and outputting whether a result of an addition/subtraction instruction is positive or negative; second means for generating information on borrow propagation from a lower bit side, distinguishing into two kinds of a borrow resulting from a subtraction (a minuend − a subtrahend) and a borrow resulting from a subtraction (a subtrahend − a minuend); and third means for handling the anticipated bit-discard amount, using the information on borrow propagation, wherein said third means outputs a bit shift amount for normalizing a mantissa value in which the bit-discard occurs based on an anticipated bit-discard amount obtained by said first means according to the presence of borrow resulting from the subtraction of the minuend minus the subtrahend when the result of the subtraction is positive and according to the presence of borrow resulting from the subtraction of the subtrahend minus the minuend when the result of the subtraction is negative.

* * * * *